(12) United States Patent
Muzyka

(10) Patent No.: US 12,415,455 B2
(45) Date of Patent: Sep. 16, 2025

(54) VERTICAL CARGO SUPPORT SYSTEM FOR A CARGO SPACE

(71) Applicant: Yaroslow Muzyka, Winnipeg (CA)

(72) Inventor: Yaroslow Muzyka, Winnipeg (CA)

( * ) Notice: Subject to any disclaimer, the term of this patent is extended or adjusted under 35 U.S.C. 154(b) by 0 days.

(21) Appl. No.: 18/072,500

(22) Filed: Nov. 30, 2022

(65) Prior Publication Data

US 2025/0222853 A1 Jul. 10, 2025

Related U.S. Application Data

(60) Provisional application No. 63/285,324, filed on Dec. 2, 2021.

(51) Int. Cl.
*B60P 7/08* (2006.01)
*B60P 7/15* (2006.01)

(52) U.S. Cl.
CPC ............ *B60P 7/15* (2013.01); *B60P 7/0815* (2013.01)

(58) Field of Classification Search
CPC .. B60P 7/15; B60P 7/0815; B60P 3/05; B62D 33/0207
USPC ...................... 410/2, 31, 130, 141, 144, 150
See application file for complete search history.

(56) References Cited

U.S. PATENT DOCUMENTS

| | | | | |
|---|---|---|---|---|
| 1,405,745 A | * | 2/1922 | Winger | B61D 45/00 410/31 |
| 5,516,245 A | * | 5/1996 | Cassidy | B60P 7/15 410/101 |
| 2011/0318133 A1 | * | 12/2011 | Arnold | B60P 7/15 410/150 |

* cited by examiner

*Primary Examiner* — Stephen T Gordon
(74) *Attorney, Agent, or Firm* — Kevin J Fournier Intellectual Property Legal Services Ltd.; Kevin J Fournier

(57) ABSTRACT

A vertical cargo support system for use in a cargo space. A plurality of header beams is provided, extending across the shorter side of the cargo space, the header being supported by header brackets attached to vertically extending tracks of a support system, the track being attached to walls of the cargo space. At least one rail support extends downward from each header, the headers being aligned in rows. A rail, in the form of an elongated portion of a cylinder, rests in support rail rests in multiple rail supports. Cargo can be attached to rails by convenient means, such as hooks, straps, or the like. The load produced by the cargo is thus applied in turn to the rail, the rail support, the header, the header brackets, and the tracks.

3 Claims, 12 Drawing Sheets

VERTICAL CARGO SUPPORT SYSTEM FOR A CARGO SPACE

CROSS REFERENCE TO RELATED APPLICATIONS

The present application claims benefit of U.S. Provisional Patent Application No. 63/285,324, filed on Dec. 2, 2021, listing a common inventor, the disclosure of which is hereby incorporated by reference.

BACKGROUND OF THE INVENTION

The system described here relates to a vertical cargo support system for use in a vehicle, such as a truck, van, highway trailer, or the like. Specifically, this system is deployed in what is here termed the "cargo space" of a vehicle, which broadly describes a volume dedicated to the storage or transport of some material. This term broadly applies to spaces such as the interior of a van or semi-trailer, or the open space such as flat-bed truck. Of course, the term vehicle extends from trucks and the like to cargo aircraft and ships. While various types of vehicles are noted in the following description, any space that is employed to store varying sorts of cargo would also profit from employment of the disclosed devices, such as transportation terminals or transfer points. Generally, any cargo space that requires differing support mechanisms to accommodate differing support needs would be candidates for the present disclosure.

The disclosed vertical support system can interface and cooperate with existing cargo support systems in wide commercial use. Such systems are primarily useful in situations where cargo cannot conveniently be packed to fill a cargo space, yet individual items require stabilization.

Such systems employ tracks, relatively long, narrow, and flat devices, formed of steel or the like, fastened to the walls or floor of the cargo space. Anchor points are fitted into slots in the track, and the resulting systems are variously described as E-track, X-track, or L-track, based on the shape of the slots. The anchor points can accommodate a range of attachment devices, such as straps, cables, or the like, used to secure cargo. The tracks are typically installed to extend the length of the long dimension of a trailer or van. Some installations employ tracks extending vertically from the floor to or near the space's ceiling. The type of cargo containers and its stability requirements dictate the sizing and arrangement of the rails, as well as the type and employment of the auxiliary equipment.

A difficulty of the various support systems now in use appears when the anticipated cargo is not amenable to resting on the floor of a cargo space. Meat, for example, particularly when in the form of complete carcasses, requires hanging storage. The difficulty with such systems is the issue of where to provide support for the vertically oriented weight of the cargo. Floors are structured precisely to provide that support, but the nature of the problem here is precisely the requirement that the cargo weight not be carried by the floor. But if the floor is ruled out for supporting the cargo, the roof is not designed to bear that load, and neither are the side walls. That problem has not been solved by the prior art.
[Examples of Other Cargo Requiring Hanging Storage]

BRIEF SUMMARY OF THE INVENTION

The vertical cargo support system may include a number of spaced apart header beams, a pair of header brackets provided at opposite ends of at least one header beam of the plurality of header beams, each header bracket being configured to engage a vertically extending track in the vehicle, at least one rail support suspended from each header beam of the plurality of header beams, and a rail supported by the rail supports.

The vertical cargo support system may also include a pair of bridges provided at opposite ends of a second header beam of the plurality of header beams. Each bridge may be configured to span between adjacent vertically extending tracks in the vehicle. The second header beam may be at an end of the vertical cargo support system.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given below and the accompanying drawings, where.

DETAILED DESCRIPTION OF AN EMBODIMENT

Referring now in detail to the accompanying Figures, an exemplary embodiment of the present invention will be described. FIGS. 1-4 illustrate such an embodiment, as described below. It is presumed that the cargo space in question is equipped with en E-Track system as described above, with vertical E-Track devices attached to the cargo space walls at selected intervals. Further, it is recognized that variations in the basic E-Track system are available on the market. Because such variations all can profit from the improvements set out here, it should be understood that when identifying a component as an E-Track device, for example, any of the similar devices, such as X-Track, etc., are covered as well.

Figure 1:
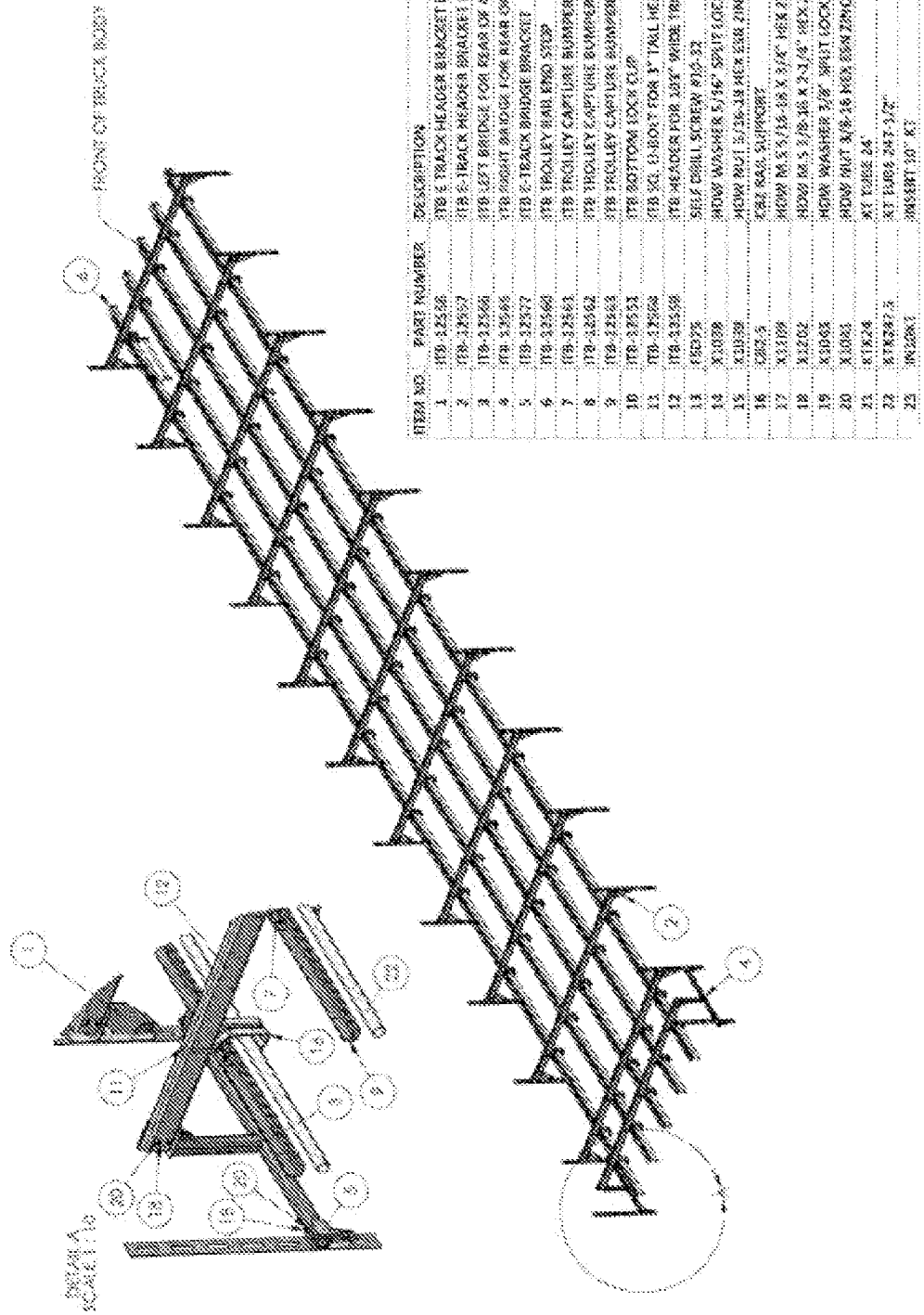
FIG. 1 provides a perspective view of the vertical cargo support system and a detail of how the vertical cargo support system can be mounted to an existing vertical track of a vehicle.
Figure 2:
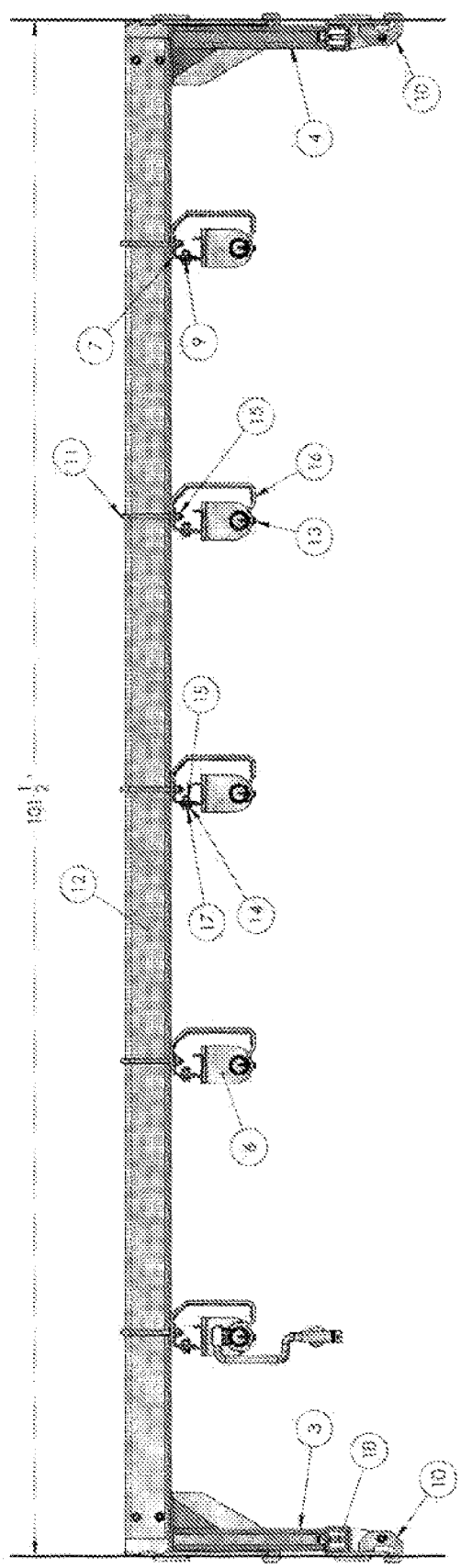
FIG. 2 provides an elevation view of the vertical cargo support system of FIG. 1.

Referring to FIGS. 1 and 2, E-Track header brackets 1 and 2 are attached to the vertical E-Track in the vehicle at the desired height from the cargo space floor, employing a device, secured in place with a bottom lock clip 10. The E-Track header brackets 1 and 2, in turn, support a header 12 which spans the width of the cargo space. This assembly of E-Track header brackets 1 and 2, bottom lock clip 10, and header 12 is replicated the length of the vehicle at selected positions of vertical E-Track, with the exception of the rearmost E-Track. This assembly solves the inherent problem of the prior art—the inability to support a vertical load. Indeed, the header 12 and header brackets 1 and 2 can be sized to support multiple vertical loads as required in the planned application.

Figure 6:
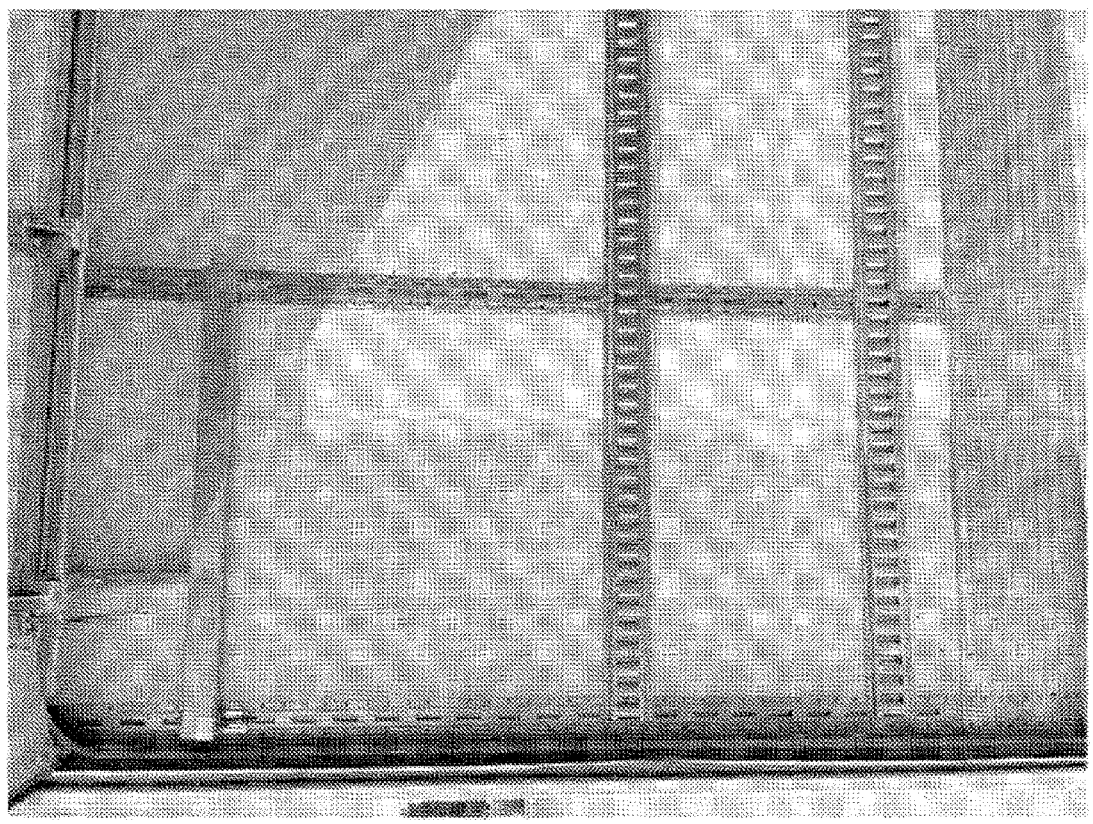
FIGS. 6 and 7 shows a rear end of the vertical cargo support system of FIG. 1 mounted to a vertical track of a delivery vehicle.
Figure 7:
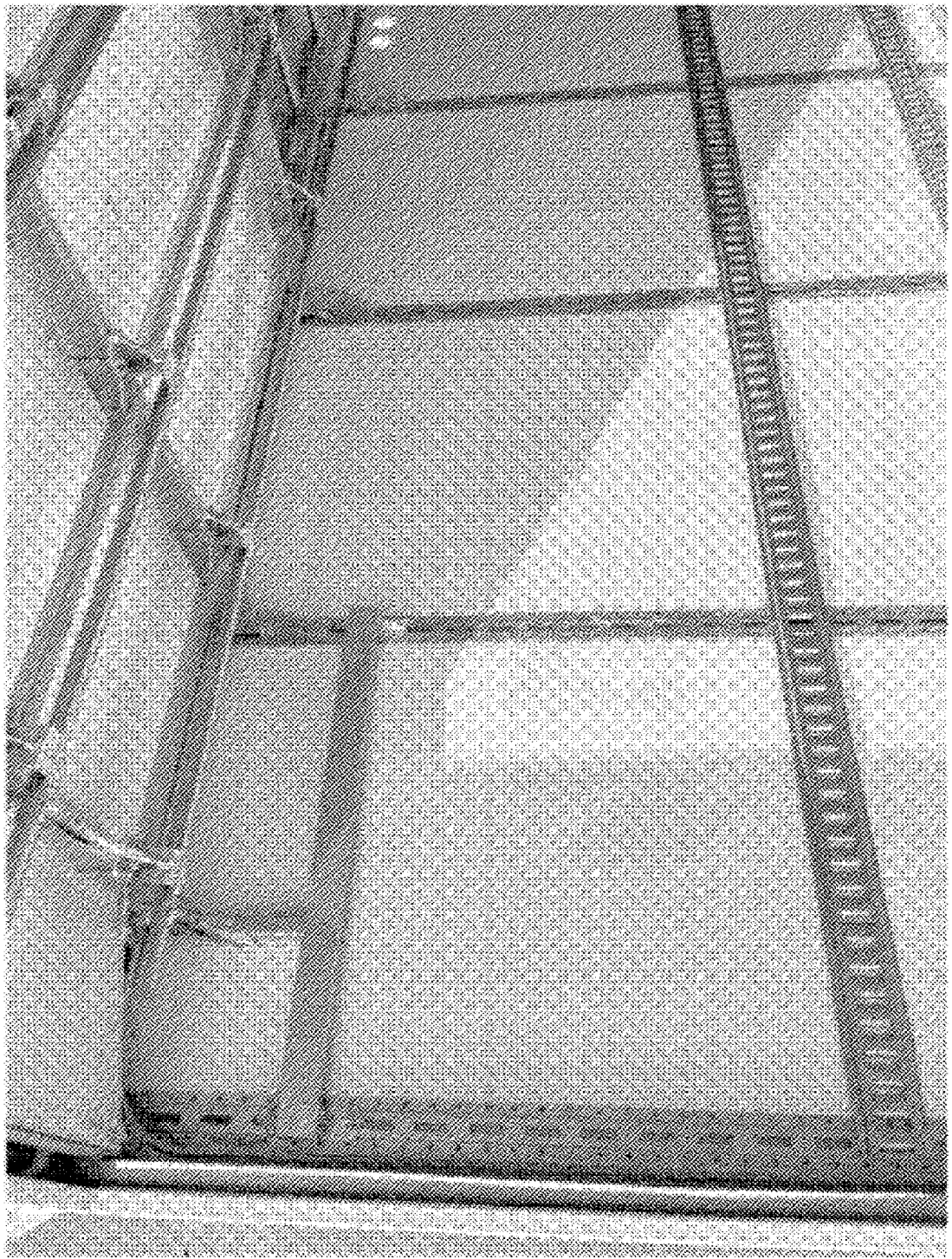
Figure 8:
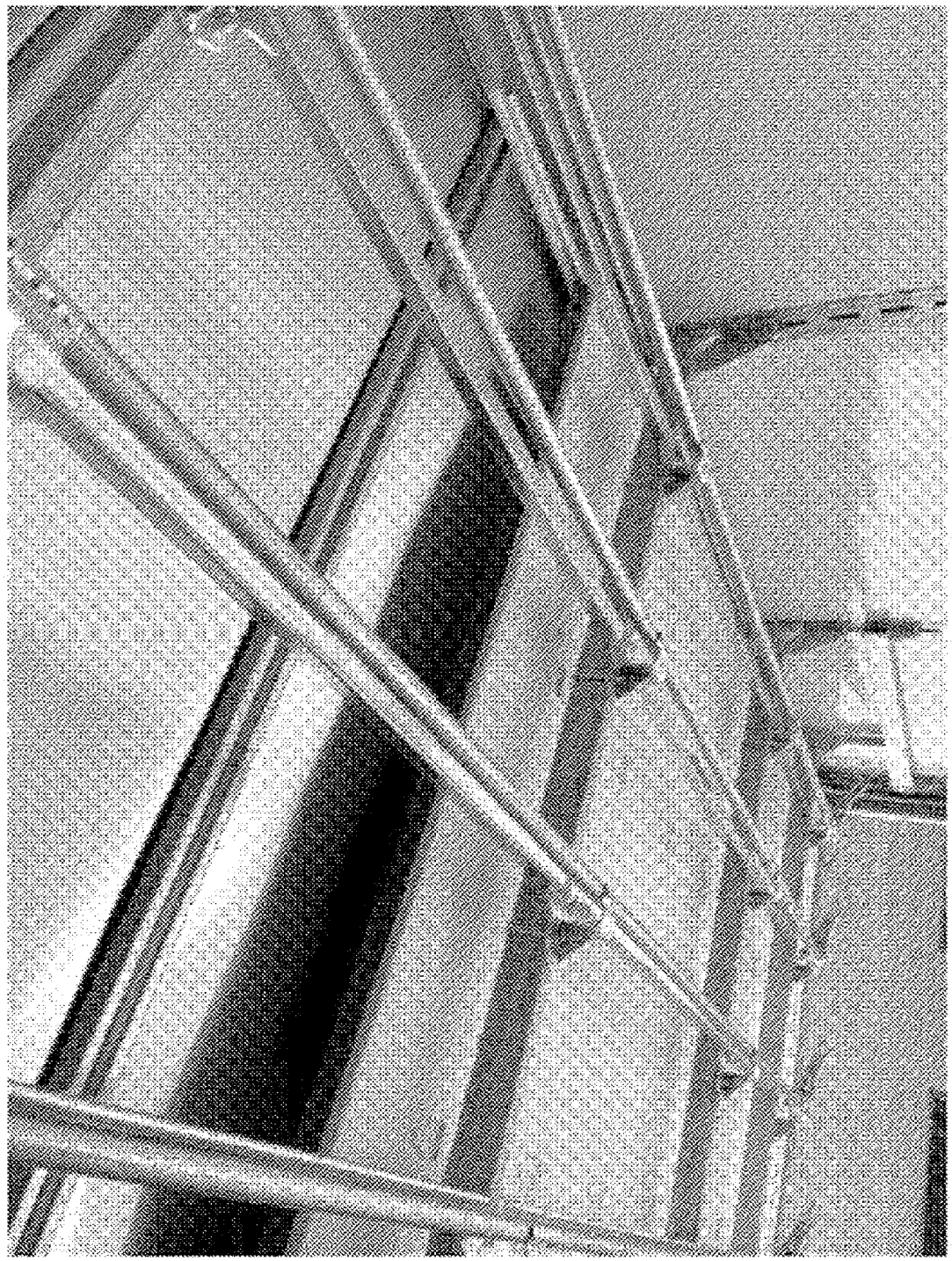
FIG. 8 shows the arrangement of the underslung rails of FIG. 1 in the delivery vehicle.
Figure 9:
FIGS. 9 and 10 show a header bracket of the vertical cargo support system of FIG. 1 mounted to the vertical track of the delivery vehicle.
Figure 10:
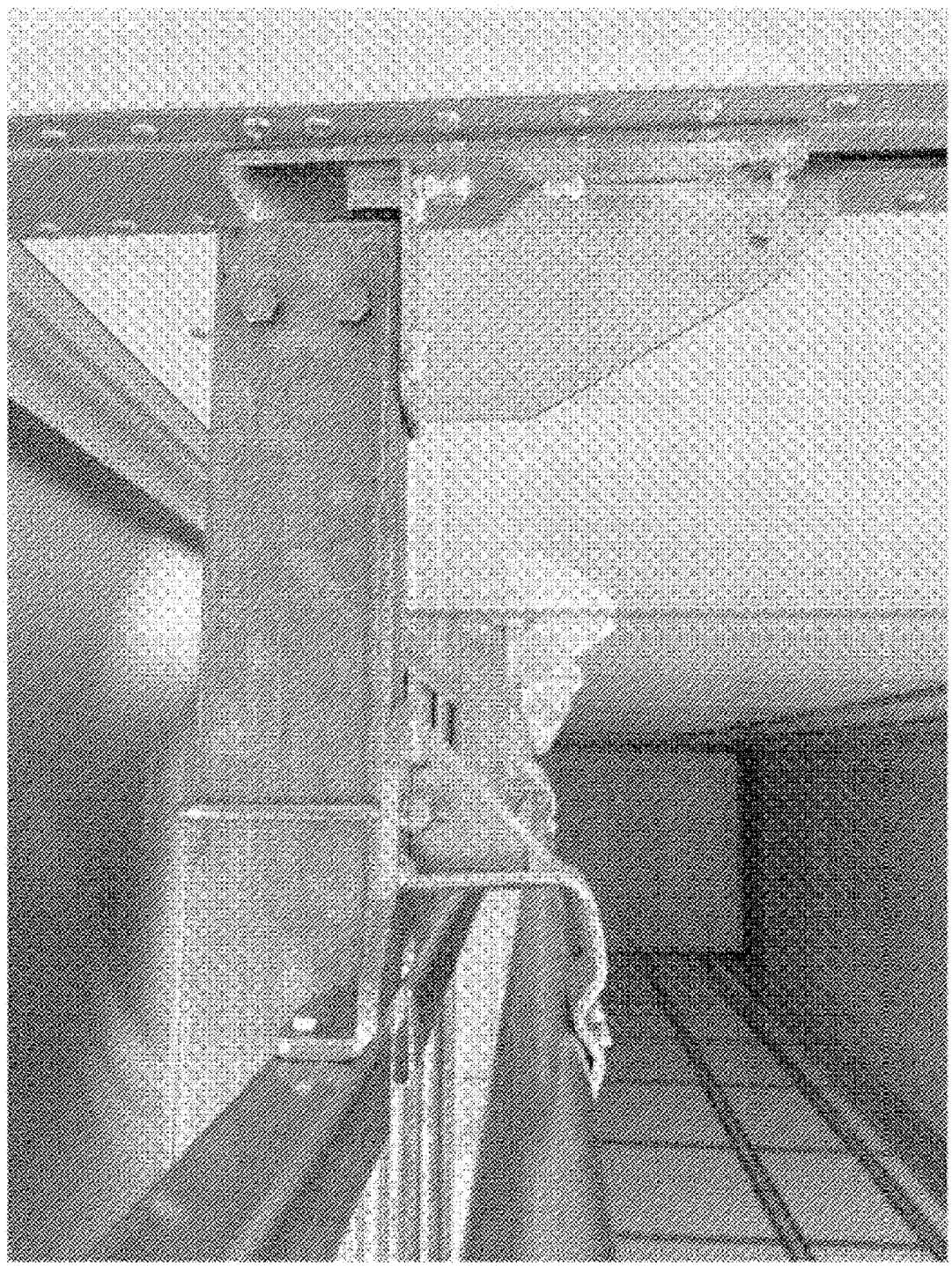

As noted above, and shown in FIGS. 1, 6 and 7, E-Track bridge brackets 5 support respective left and right bridges 3 and 4 at the rear of the vehicle. Those bridges support opposite ends of the rearmost header 12 and are arranged to provide clearance with the rear door of the vehicle when opening and closing the door. That is, similar to the E-Track header brackets 1 and 2, the E-Track bridge brackets 5 and bridges 3 and 4 support the rear most header 12 and any working loads carried by that member. The left and right bridges 3 and 4 may be inverted T-shapes and extend between two adjacent E-Tracks.

It should be noted that header 12, bridge brackets 5, and bridges 3, 4 are fabricated from conventional structural stock, working together with particular devices of the pre-installed E-Track (or similar) system. Sizing and selecting particular components is well within the knowledge of those having skill in the art.

The variety of materials required to be supported in a particular cargo space requires similar variety in the location of vertical support points on the headers 12. It can be appreciated from FIG. 1 that headers 12 are in fixed fore and aft locations in the cargo space. FIG. 1 also suggests the requirement that vertical support points be movable to account for load requirements both in both the length and width of the cargo space.

Figure 3:
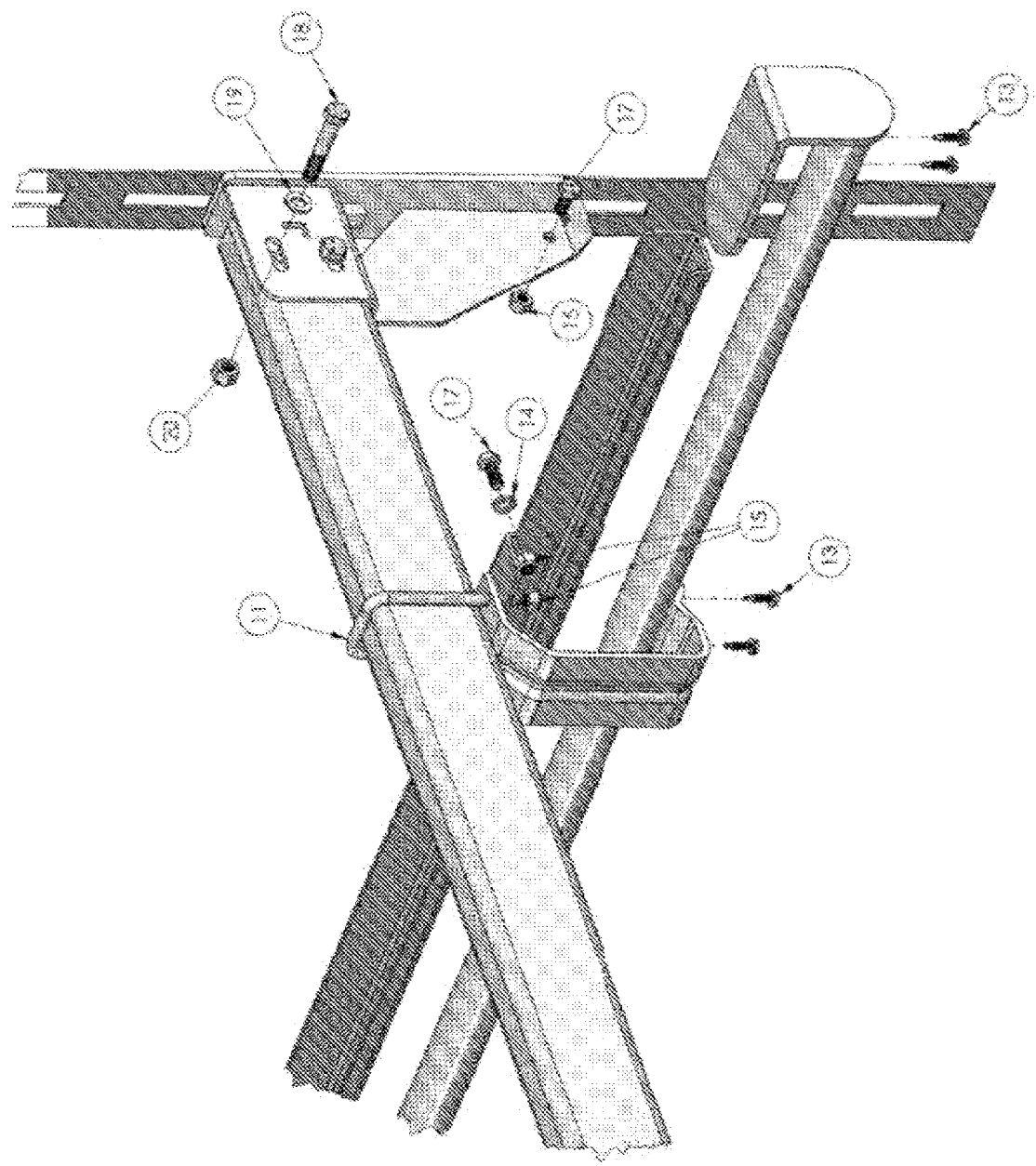
FIG. 3 provides a perspective view of a mounting arrangement for an underslung rail of the vertical cargo support system of FIG. 1.

FIGS. 2 and 3 illustrate the solution to that problem. Fore and aft adjustment of the load support point is achieved by providing a set of rails 22, each extending the length of the cargo support space. Each rail is formed as a half-cylinder, with its flat side oriented upward toward the cargo space ceiling. Each rail is supported from a header 12 by a rail support 16, the set of rail supports being governed in position and number by the needs of a given application. Those of skill in the art will understand that rail supports can be shaped in a number of variations. As shown here, that component is formed in a general C-shape, with the round side of a rail 22 carried in a rail rest 19 formed in the bottom arm of the rail support, sized to accept the round side of the rail. If desired, the rail can be attached to the corresponding rail support by screws 13 or the like.

Load support points are defined on each rail as convenient points for attaching a device for connecting a load, such as a discrete item being transported in the cargo space, to a rail. Hooks or clamps, or broadly similar devices would serve for that function, and those of skill in the art will be able to modify such devices as would prove useful in engaging the load, item by item, to the structure formed by a rail, a rail support, a header, a header bracket, and the track. The rail supports 16 also support the trolley capture bumpers 8 or 9, which are positioned above the rail 21 with a small clearance above the trolley to ensure the trolley does not disengage from the rail 21 while the vehicle is in motion. A trolley capture bumper bracket 7 connects the trolley capture bumper 8 or 9 to the corresponding rail support 16. A trolley rail end stop 6 may be provided at an end of the rail 21 to prevent the trolley from falling off the end of the rail.

Side-to-side movement of the vertical load point is accomplished by attaching each rail support 16 to the corresponding header 12 with a U-bolt 11. Loosening that bolt allows position adjustment of the applicable rail support 16.

Figure 11:
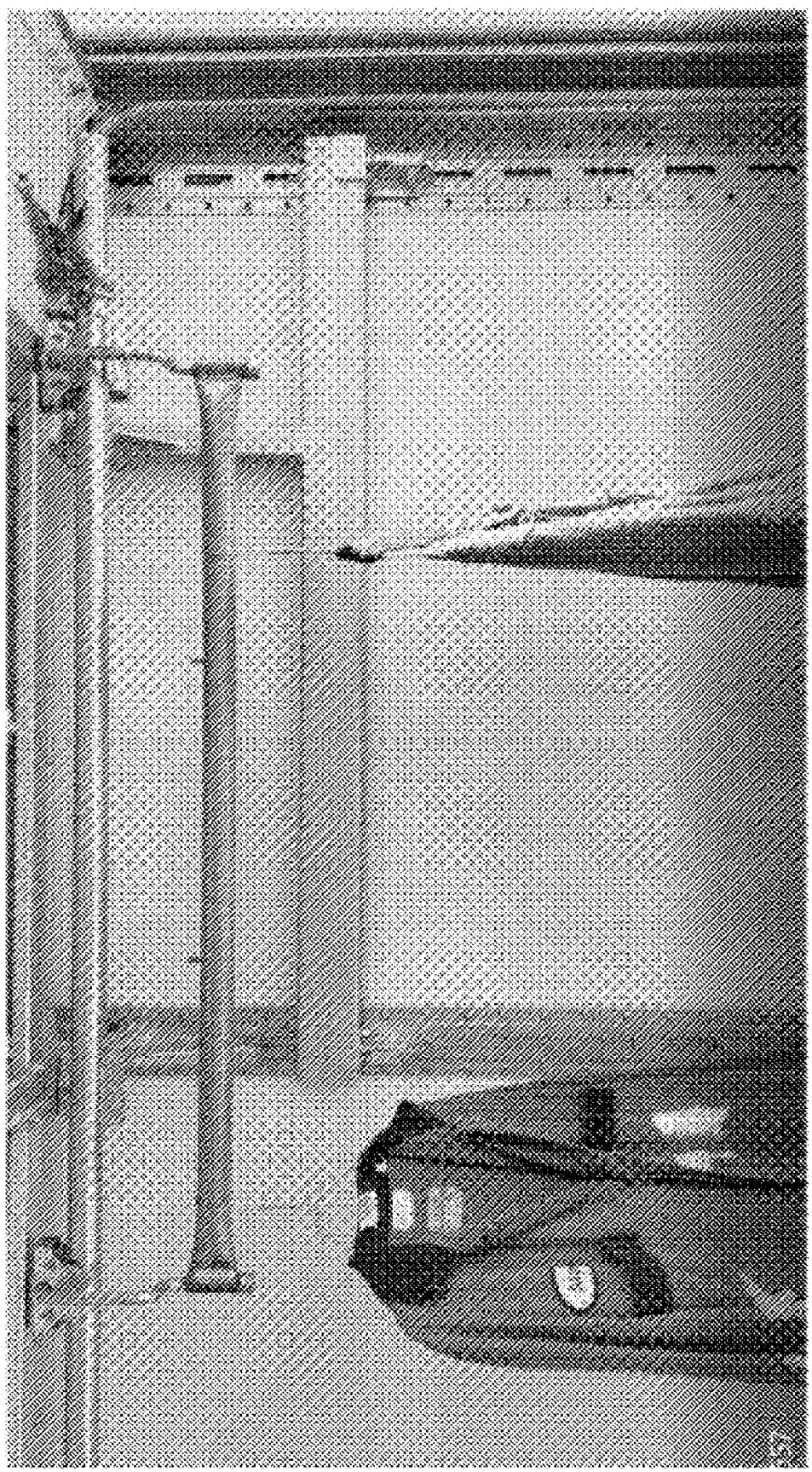
FIGS. 11 and 12 show a vise-grip and a trolley attached to the vertical cargo support system of FIG. 1.
Figure 12:
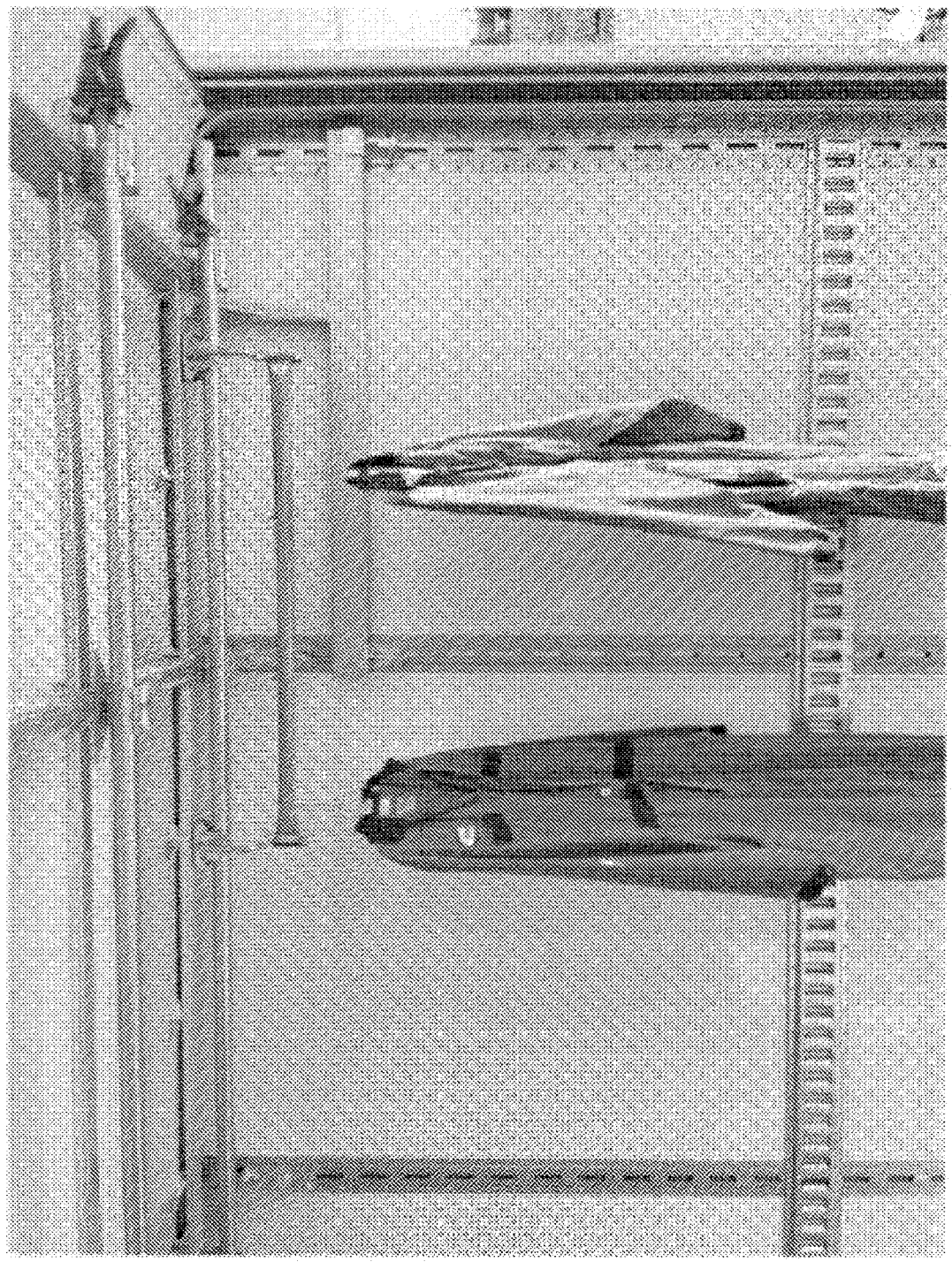

To ensure the items do not move along the rails while loading and while the vehicle is in transit, vise-grip-style stops 23 may be clamped at various locations along a rail including at intermediate and rear most positions of the items on each rail. FIGS. 11 and 12 show examples of the vise-grip style stops 23.

Figure 4:
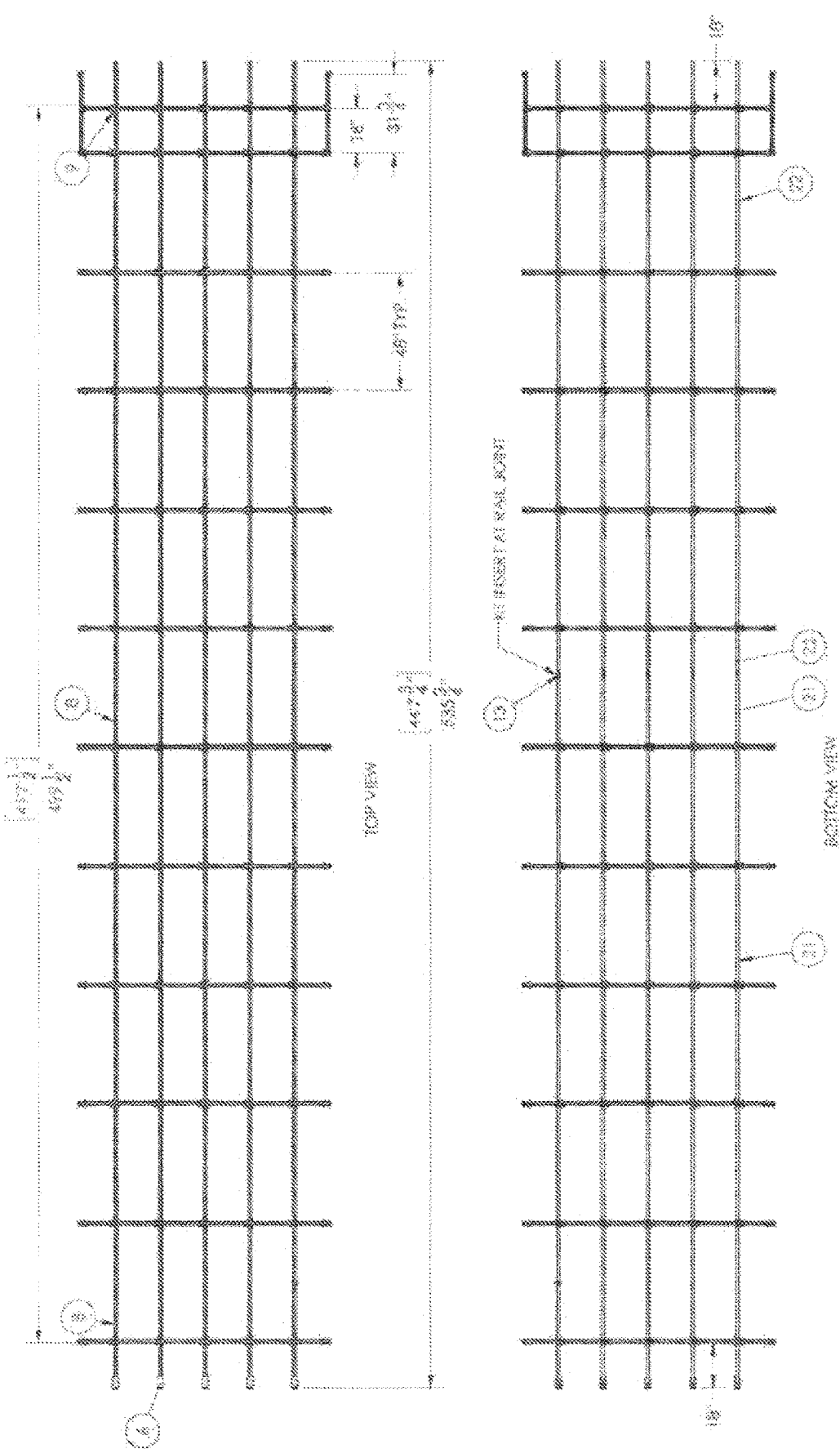
FIG. 4 provides plan views from above and below the vertical cargo support system of FIG. 1.
Figure 5:
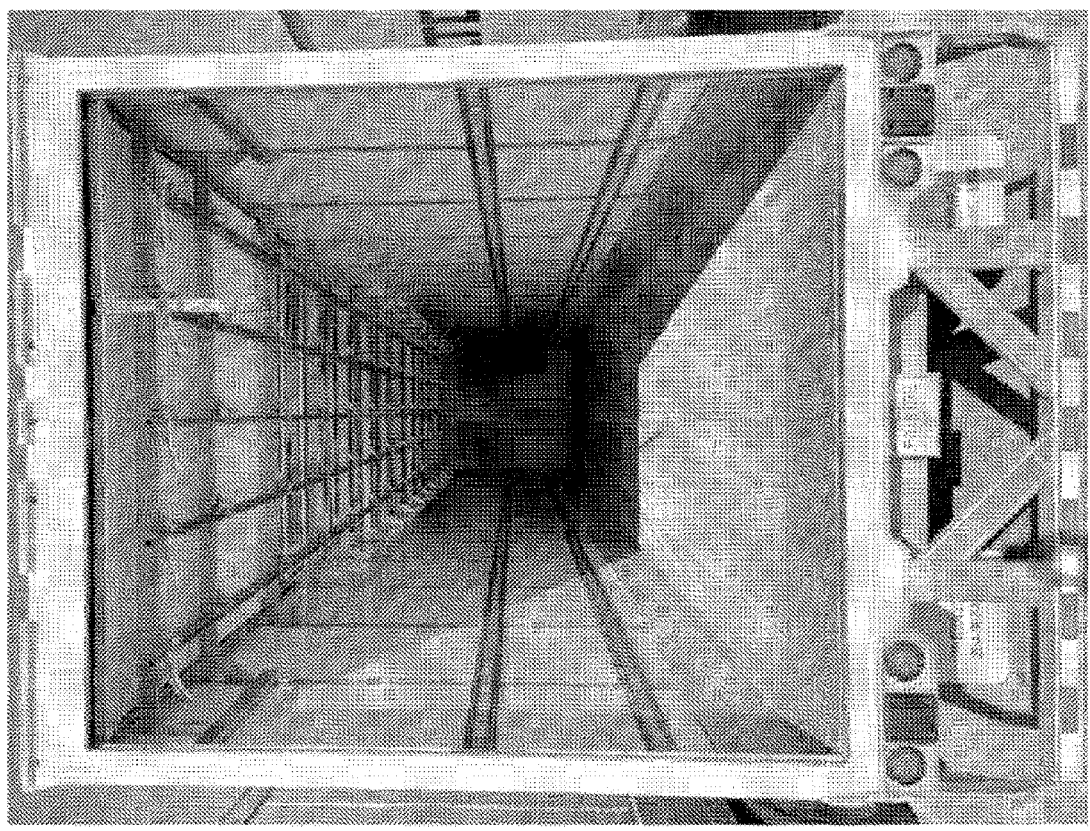
FIG. 5 shows the vertical cargo support system of FIG. 1 mounted in a delivery vehicle.

Each rail 22 should extend through the length of the cargo space. There is no need, however, for each rail to be an integral unit. As seen in FIG. 4, the upper portion of the drawing shows all rails 22 extending the entire length of the cargo space. In the lower portion, however, the rail labeled 22 only extends for only about half that length; to make up the difference, a second rail 21 is added, abutting rail 22. Those of skill in the art will understand that the set of rails used in a given application can be a variety of lengths, so long as they make up the full distance across the cargo space.

As shown in FIGS. 3, 11 and 12, a trolley 25 can be supported on a rail 22. The trolley may include rolling supports at opposite ends of the trolley. A support bar is suspended below the rail 21 and is connected to the rolling supports by connecting members at opposite ends of the support bar. Each of the connecting members may have a C-shape to allow the support bar to be in line with the rail 22. The resulting trolley 25 can be useful in carrying tools and the like, up and down the cargo space. As shown in FIG. 11, the trolley can also be used in storing clothing or equipment for the cargo space crew.

In operation, the disclosed system allows for the storage and transportation of cargo, without incurring damage due to the cargo being placed on the cargo space floor. Each item of cargo is attached to a rail, using a hook, strap, or other attachment device. The structure then transmits the applied force in turn to the rail support, the header, the header brackets, and to the E-Track or similar system, and on to the cargo space structure, such as a trailer or van body.

FIGS. 5-9 shows an example of how the vertical cargo support system described above can be mounted in a delivery vehicle.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims. For example, while the attached Figures include various dimensions for the components of the vertical cargo support system, it is understood that these dimensions can be adjusted to fit various sized vehicles. In addition, while the description refers to E-Tracks, it is understood that the present invention can be used with other vertical track systems.

I claim:

1. A vertical cargo support system for a cargo space, comprising:
a plurality of spaced apart header beams,
each header beam having a pair of header brackets at opposite ends of the header beam, and each header bracket shaped to accept and support an end of the header beam;

each header bracket being configured to engage a vertically extending track in the cargo space;

at least one rail support suspended from each header beam, the rail support being generally flat and generally formed having the shape of a letter C, including a rail rest formed into the rail support and dimensioned to accept a rail therein and a plurality of rails, each supported by rails supports of the at least one rail support.

2. The vertical cargo support system of claim 1, further comprising a pair of bridges provided at opposite ends of a second header beam of the plurality of header beams, wherein each bridge is configured to span between adjacent vertically extending tracks in the vehicle.

3. The vertical cargo support system of claim 2, wherein the second header beam is at an end of the vertical cargo support system.

\* \* \* \* \*